United States Patent [19]
Loosen

[11] Patent Number: 5,953,858
[45] Date of Patent: Sep. 21, 1999

[54] COLLAPSIBLE PLASTIC PLANTER BOX

[75] Inventor: Ronald E. Loosen, Temecula, Calif.

[73] Assignee: Amaroo Enterprises, Inc., Temecula, Calif.

[21] Appl. No.: 08/916,525

[22] Filed: Aug. 22, 1997

[51] Int. Cl.$^6$ .................................................. A01G 17/04
[52] U.S. Cl. ........................... 47/66.1; 47/66.4; 47/66.2; 47/42
[58] Field of Search ................... 47/66.1, 66.2, 47/66.3, 42, 43, 44, 73; 217/14, 15, 16; 220/4.31, 4.29, 4.32, 625

[56] References Cited

U.S. PATENT DOCUMENTS

| | | | |
|---|---|---|---|
| 1,146,219 | 7/1915 | Way | 217/14 |
| 1,500,917 | 7/1924 | Bell | 220/4.09 |
| 1,858,902 | 5/1932 | Prantl | 47/66.1 |
| 1,942,975 | 1/1934 | Polgar | 47/47 |
| 2,219,690 | 10/1940 | Leydecker | 47/76 |
| 2,792,142 | 5/1957 | Sandkuhle | 217/12 R |
| 2,881,939 | 4/1959 | Nelson | 217/12 R |
| 3,047,183 | 7/1962 | Papa | 220/4.33 |
| 3,076,289 | 2/1963 | Gallo | 47/83 |
| 3,164,281 | 1/1965 | Williams, Jr. | 217/14 |
| 3,262,665 | 7/1966 | Black | 248/153 |
| 3,951,294 | 4/1976 | Wilson | 220/5 |
| 3,955,320 | 5/1976 | Serovy et al. | 47/66.1 |
| 4,019,279 | 4/1977 | Moorman et al. | 47/25 |
| 4,031,663 | 6/1977 | Brunk | 47/66.1 |
| 4,031,832 | 6/1977 | Edwards | 111/4 |
| 4,363,189 | 12/1982 | O'Donnell, III | 47/73 |
| 4,497,132 | 2/1985 | Whitcomb | 47/73 |
| 4,612,726 | 9/1986 | Mori | 47/66.1 |
| 4,665,645 | 5/1987 | Schau, III et al. | 47/25 |
| 4,716,680 | 1/1988 | Whitcomb et al. | 47/73 |
| 4,796,383 | 1/1989 | Inoue et al. | 47/73 |
| 4,809,851 | 3/1989 | Oestreich, Jr. et al. | 206/599 |
| 4,850,136 | 7/1989 | Vollers | 47/43 |
| 4,901,473 | 2/1990 | Taule | 47/66.1 |
| 5,236,099 | 8/1993 | Fties et al. | 220/4.31 |
| 5,241,784 | 9/1993 | Henry | 47/66.1 |
| 5,383,302 | 1/1995 | Hill | 47/78 |
| 5,704,508 | 1/1998 | Keip et al. | 220/431 |

FOREIGN PATENT DOCUMENTS 2 273 029   8/1994   United Kingdom .

*Primary Examiner*—Michael J. Carone
*Assistant Examiner*—Yvonne R. Abbott
*Attorney, Agent, or Firm*—Knobbe, Martens, Olson & Bear LLP

[57] ABSTRACT

A collapsible, reusable plastic planter box for trees, plants and shrubs. The planter box comprises four interlocking side panels, stabilizer receptacles on the outside surface of the side panels, and a removable bottom panel.

14 Claims, 3 Drawing Sheets

COLLAPSIBLE PLASTIC PLANTER BOX

FIELD OF THE INVENTION

The present invention relates to a nursery box used to hold trees, plants and shrubs. More specifically, the invention relates to a collapsible, reusable plastic planter box comprising four interlocking side panels having stabilizer receptacles thereon, and a bottom panel which snaps into the assembled side panels from below.

BACKGROUND OF THE INVENTION

Large containers for growing trees and shrubs in nurseries are generally made of wood. Such containers comprise four wooden panels generally held together by metal straps. To remove the plant, the straps are cut and the wooden panels fall away from the plant. This type of container has distinct disadvantages. The wooden panels, and particularly the base, often rot over extended periods of time and are generally not reusable, which increases the cost to the nursery. Because the bottom of the wooden containers rests on the ground, roots often grow out of the container into the ground which makes removal of the plants difficult and stresses the plant. In addition, wooden boxes are subject to structural failure. The roots growing in the soil within the box tend to be excessively tangled and clustered, thus inhibiting outward growth into the soil in which the plant is transplanted.

U.S. Pat. No. 4,850,136 discloses a circular plastic horticultural box comprising multiple wall sections having laterally interfitting tongue and groove connections and elongated connectors extending through these elements. U.S. Pat. No. 4,796,383 discloses a collapsible reusable planted box comprising four side panels containing inserting and receiving means which form the connection between tow adjacent side panels. These connections are secured by securing means located adjacent to the receiving means to hold the receiving means in place.

Large plants in nurseries are subject to blow-over during windy and inclement weather conditions. Thus, there is a need for a large planter box containing stabilization means. Previously described planter boxes do not address the issue of stability during such conditions. The present invention addresses this need.

SUMMARY OF THE INVENTION

One embodiment of the present invention is a reusable box for holding a nursery plant, comprising four interlocking side panels, each of the side panels having an inside surface, an outside surface, a first edge, a second edge and a stabilizer receptacle on the outside surface. Preferably, the stabilizer receptacle is integrally molded with the side panels. Alternatively, the stabilizer receptacle is fastened to said side panels. The box may further comprise a stabilizer in each receptacle extending outwardly and downwardly from the receptacle to stabilize the box from tipping over. In one aspect of this preferred embodiment, the stabilizer is a pipe or board. Advantageously, the first edge contains a plurality of pins and the second edge contains a plurality of slots. In another aspect of this preferred embodiment, the first edge contains a latch and said second edge contains a receptacle for the latch.

The present invention also provides in a tree box made of plastic, the improvement comprising a free-standing or self-supporting bottom panel which can snap into and out of the tree box from the bottom.

Another embodiment of the invention is a collapsible nursery planter box, comprising:

four side panels having an outside surface, inside surface, first edge and second edge, the first edge containing a plurality of pins and the second edge containing a plurality of slots, such that the side panels interlock upon relative vertical movement of one of the side panels with respect to another of said the panels; and a bottom panel removably engaging the side panels.

Preferably, the box further comprises stabilizer receptacles on the outside surface of each of the side panels. Advantageously, the stabilizer receptacles are integrally molded with the side panels. Alternatively, the stabilizer receptacles are fastened to the side panels. According to one aspect of this preferred embodiment, the inside surface of the side panels contains a plurality of root directors. Preferably, the bottom panel contains a plurality of openings therein. In another aspect of this preferred embodiment, the first edge contains a latch and the second edge contains a receptacle for receiving the latch. Preferably, the bottom panel forms an air pruning gap. The box may further comprise a stabilizer in each receptacle extending outwardly and downwardly from the receptacle to stabilize the box from tipping over. In one aspect of this preferred embodiment, the stabilizer is a pipe or board.

DETAILED DESCRIPTION OF THE PREFERRED EMBODIMENTS

The present invention provides a collapsible, reusable planter box for holding trees, shrubs, plants and the like. The planter box comprises four interlocking side panels and a bottom panel which is snapped into the assembled side panels from below. Each side panel also contains stabilizer receptacles on its outer surface for receiving a stabilizer bar or pipe (i.e. PVC pipe) which functions to secure the box to the ground or to a holder placed on secured to the ground, or to stabilize the box against blow-over. One end of the bar or pipe is inserted into the stabilizer receptacle, while the other end is inserted either into or against the ground or into a receptacle secured to the ground (See FIG. 1).

The planter box of the invention has numerous advantages over the wooden planter boxes which are currently used in the nursery industry. The box is easy to assemble, collapsible, reusable, durable, and recyclable. In addition, the bottom and side panels are of uniform construction and are stackable. Moreover, metal banding of the box is not required. The box also contains a lip which allows it to be lifted by a forklift and retains moisture so the plant does not dry out during shipping. The inside surface of each panel contains vertical root directors for directing the roots downward and preventing them from spiraling or balling. When snapped into the assembled side panels from below, the bottom of the box does not rest on the ground, but is elevated and forms a root pruning air gap which prevents the roots from growing out of the box and into the ground. This occurs because root growth is inhibited by air and light.

The planter box is typically made of plastic, preferably polyethylene, most preferably high density polyethylene (HDPE). However, other materials are also contemplated including metals, polypropylene and polystyrene. Although high density polyethylene is preferred, the use of low density polyethylene, linear low density polyethylene and mixtures of high density/low density polyethylene are also contemplated. The side and bottom panels of the planter box are each one piece articles formed by standard injection molding procedures well known in the art. Briefly, high density polyethylene is melted, injected into a mold, allowed to cool and removed from the mold. Excess pieces of HDPE, if any, are trimmed and removed to yield the final product. The planter box can be manufactured to any desired size or capacity, although the most preferred sizes are 24, 36 and 48 inches.

Figure 1:
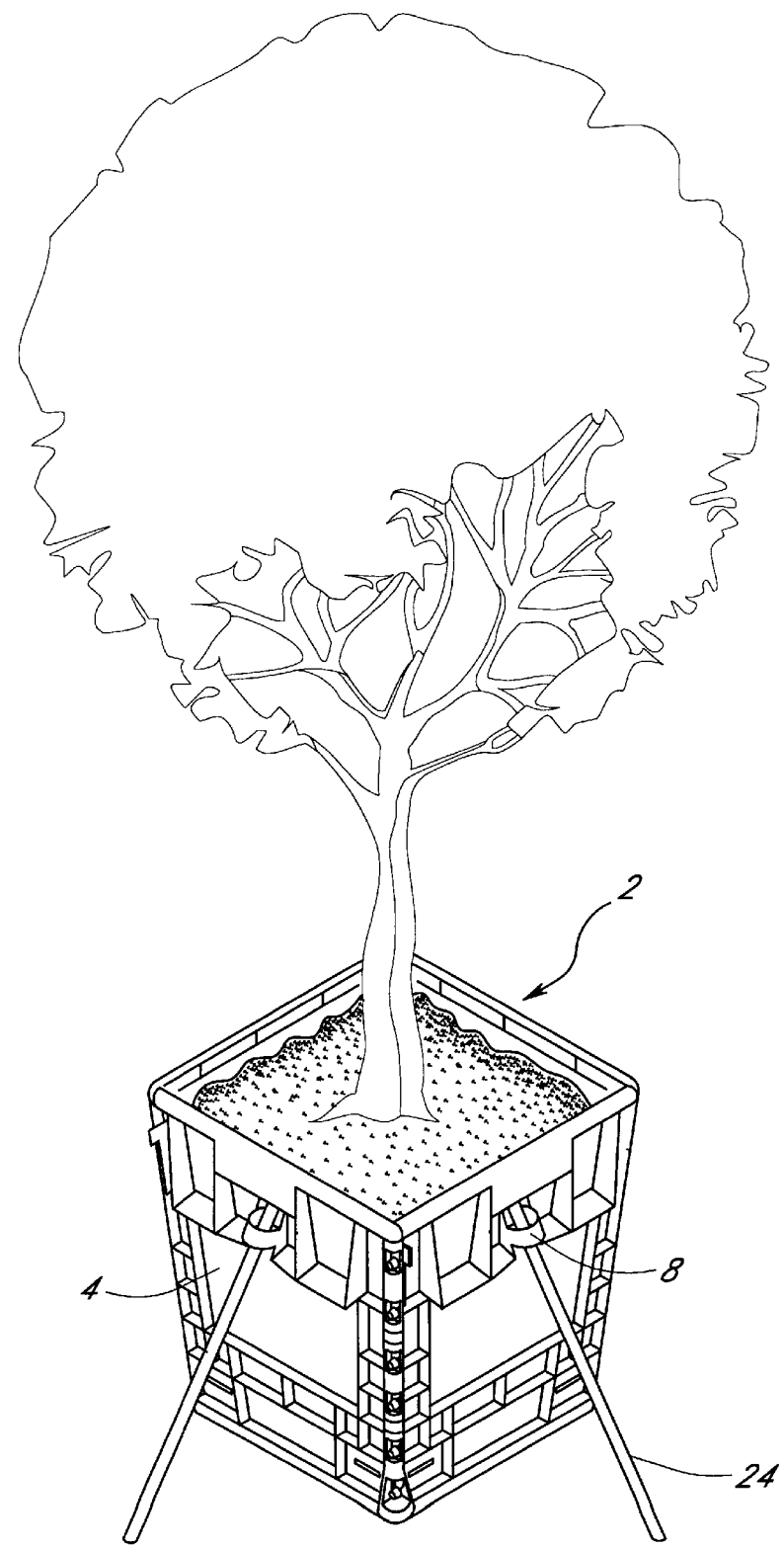
FIG. 1 is a plan view of the planter box of the invention containing a plant.
Figure 2:
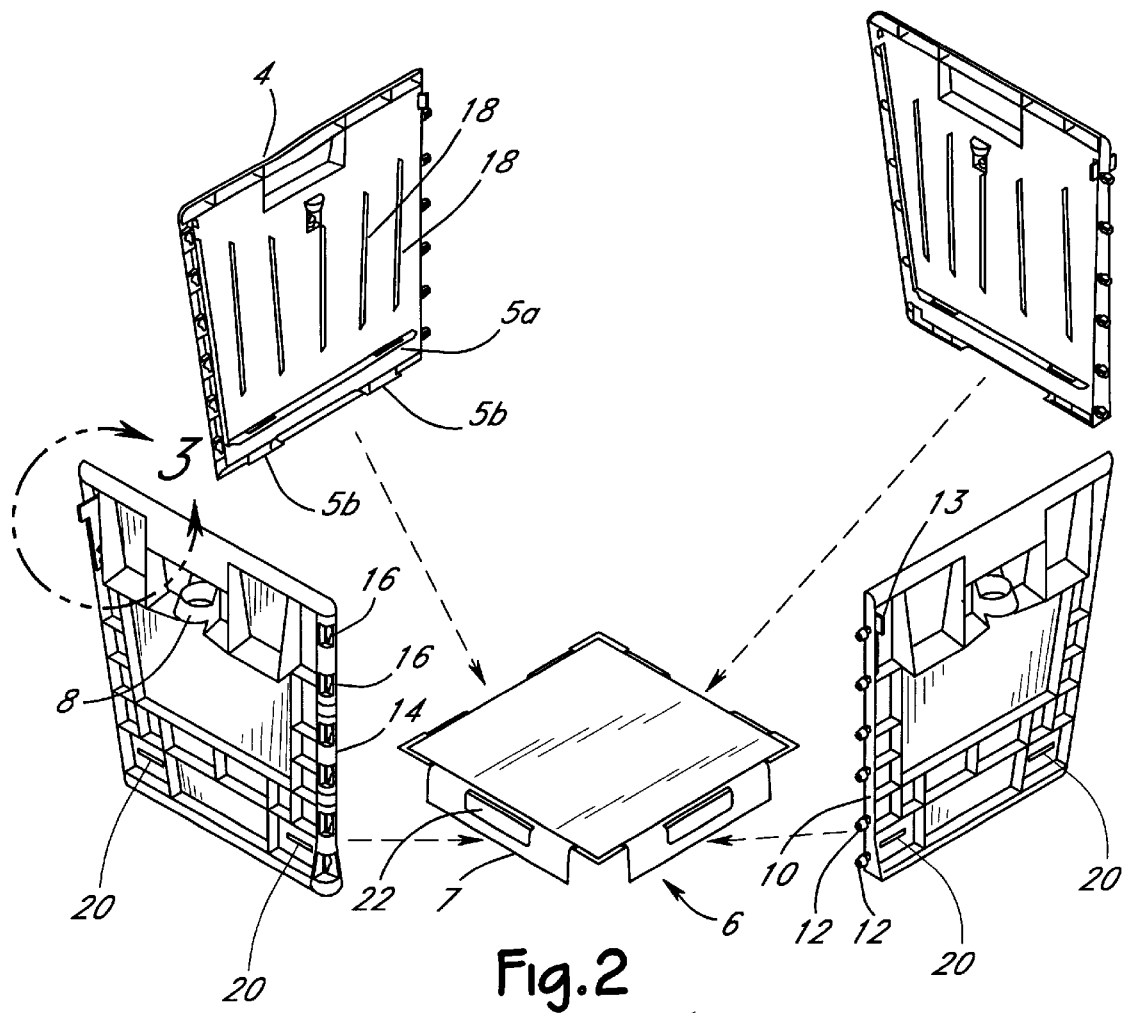
FIG. 2 is an exploded view of the planter box of the invention showing the bottom panel and four side panels.
Figure 4:
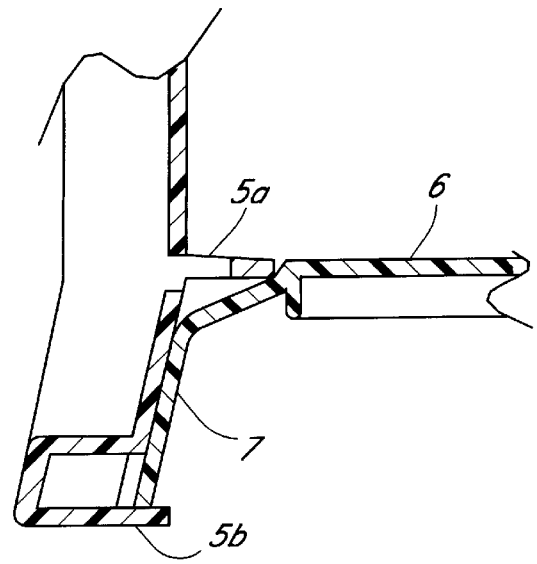
FIG. 4 is a cross sectional view of the bottom panel and a side panel showing how the two panels interlock.

Referring to FIGS. 1 and 2, planter box 2 contains four side panels 4 and a bottom panel 6. The bottom panel contains four downwardly protruding projections 7 at approximately right angles thereto. Side panels 4 contain a lip 5A extending horizontally across the bottom portion of the side panel 4 and two lips 5B also extending horizontally, on the inner surface thereof. Lip 5A is above lips 5B and contacts the top edges of bottom panel 6 when bottom panel 6 is snapped into the assembled side panels. Lips 5B engage the bottoms of projection 7 to hold the bottom panel 6 in place (FIG. 4).

Figure 3:
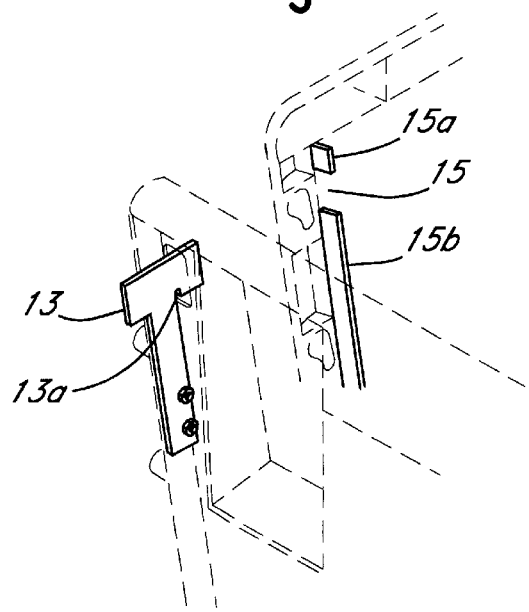
FIG. 3 is a detailed view of the latch on one panel and the notch for engaging the latch on the adjacent panel.

Stabilizer receptacles 8 are provided on the outside surface of side panels 4 approximately equidistant from the two edges 10 and 14 and near the top of the panel 4. In a preferred embodiment, the stabilizer receptacle 8 is an annular collar or recess adapted to receive a pipe, board or bar as a stabilizer, and to direct the stabilizer 24 outwardly and downwardly at an angle to the panel 4, as shown in FIG. 1. The first edge 10 of each side panel 4 contains a plurality of pins 12 along its length and a latch 13 at the top. The second edge 14 of each side panel 4 contains a plurality of slots 16 along its length for receiving the pins 10 and a receptacle 15 formed by projections 15A and 15B at the top end thereof for engaging latch 13 (FIG. 3). The side panels 4 are connected by sliding the plurality of pins 12 into the plurality of slots 16, then moving one panel vertically with respect to the other panel to move the pins 12 in a locking relationship with the slots 16. Latch 13 is then placed in receptacle 15 such that notch 13A engages projection 15B to prevent the panels from separating. The side panels 4 thus angle outwardly from the bottom 6 of the planter box 2. The inside surface of side panels 4 contain a plurality of root directors 18 which are raised ribs extending vertically downwardly for promoting downward plant root growth (FIG. 2). The bottom panel 6 may also contains a plurality of openings to allow drainage of water from the box 2. The bottom panel 6 does not rest on the ground. Instead, it is elevated by projections 7 which are engaged by lips 5B, and forms a root pruning air gap 22 which prevents growth of the roots out of the box 2 and into the ground. Side panels 4 also contain openings 20 near the bottom thereof to allow drainage of water.

Figure 5:
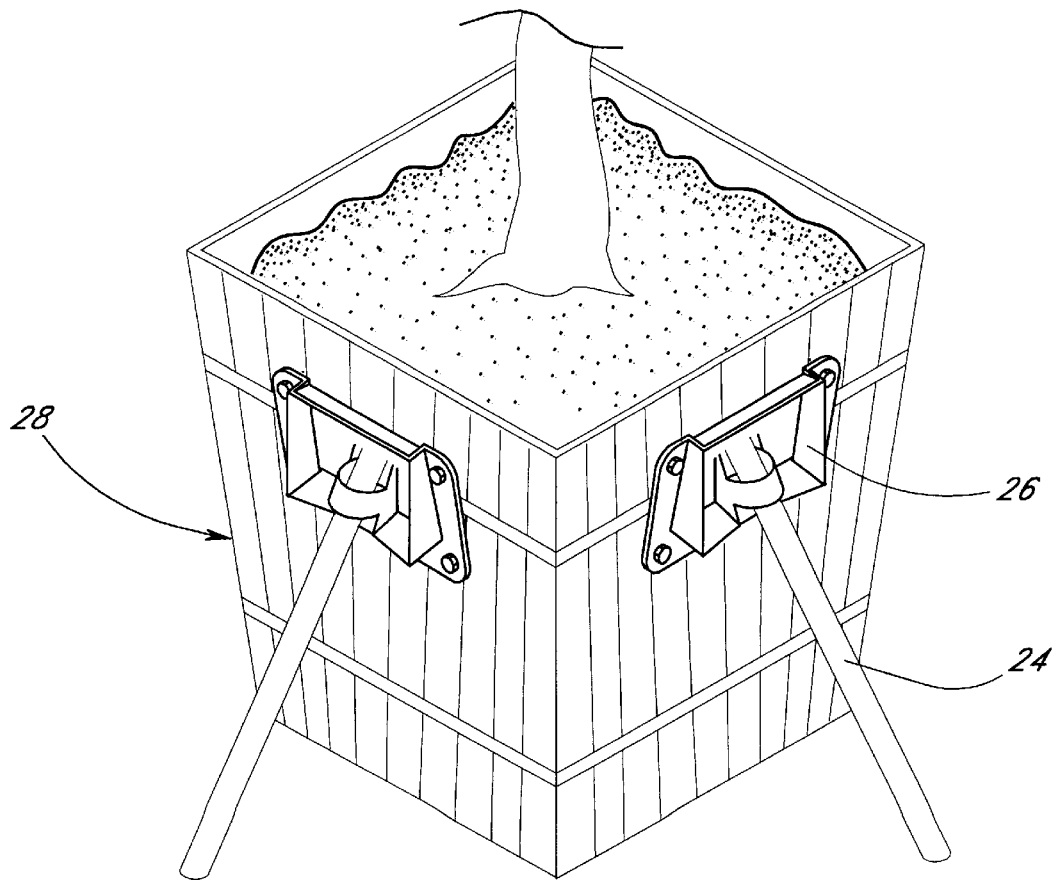
FIG. 5 is a plan view of a wooden planter box onto which a stabilizer receptacle is attached.

As shown in FIG. 1, one end of a stabilizer bar 24 (such as PVC pipe, metal pipe or wood) is inserted into stabilizer receptacle 8. The other end of bar 24 is inserted against or into the ground, or into a holder which is placed on the ground or secured to the ground. The box may be stabilized by any of the above stabilizing means by insertion of bar 24 into one, two, three or all four stabilizer receptacles 8. The stabilizer receptacle may also be made as a separate injection-molded article 26, separate from the side panels. In addition, when side panels do not form correctly in the injection molding procedure, the stabilizer receptacles can be salvaged and used as a separate device. These stabilizer receptacles 26 can be secured to the sides of existing planter boxes 28 (FIG. 5), for example to wooden boxes commonly used in the nursery industry to provide stabilization from blow-over due to wind and inclement weather. The stabilizer receptacles 26 are typically fastened to one or more sides of the wooden box and allow stabilization as described above (FIG. 5).

In one method of removing a plant from the box 2, the box 2 containing the plant is laid on one of its side panels 4 in or adjacent to a hole into which the plant will be placed. The bottom panel 6 is removed first by disengaging projections 7 from lips 5B. The side panels 4 of the box are then separated from each other by moving one panel vertically with respect to the other in the opposite direction of the interlocking procedure described above. The plant is then lifted and the hole is filled.

While particular embodiments of the invention have been described in detail, it will be apparent to those skilled in the art that the disclosed embodiments may be modified. Therefore, the foregoing description is intended to be exemplary rather than limiting, and the true scope of the invention is that defined in the following claims.

What is claimed is:

1. A reusable plastic box for holding a nursery plant, comprising four interlocking said panels, each of said side panels having an inside surface, an outside surface, a first edge, a second edge, and a stabilizer receptacle on the outside surface, wherein said first edge contains a latch and said second edge contains a receptacle for said latch; and a stabilizer in each said receptacle extending outwardly and downwardly from said receptacle to stabilize said box from tipping over.

2. The box of claim 1, wherein said stabilizer receptacle is integrally molded with said side panels.

3. The box of claim 1, wherein said stabilizer receptacle is fastened to said side panels.

4. The box of claim 1, further comprising a stabilizer in each said receptacle extending outwardly and downwardly from said receptacle to stabilize said box from tipping over.

5. The box of claim 4, wherein said stabilizer is a pipe or board.

6. The box of claim 1, wherein said first edge contains a plurality of pins and said second edge contains a plurality of slots.

7. A collapsible nursery planter box, comprising:

four side panels, each having an outside surface, inside surface, first edge and second edge, each of said outside surfaces comprising stabilizer receptacles, said first edge containing a plurality of slots, wherein said side panels are connected by laterally sliding said panels together to engage each other, followed by relative vertical movement of one of said side panels with respect to another of said side panels to lock said engaged panels together;

a stabilizer in each said receptacle extending outwardly and downwardly from said receptacle to stabilize said box from tipping over; and a bottom panel removable engaging said side panels.

8. The box of claim 7, wherein said stabilizer receptacles are integrally molded with said side panels.

9. The box of claim 7, wherein said stabilizer receptacles are fastened to said side panels.

10. The box of claim 7, wherein the inside surface of said side panels contains a plurality of root directors.

11. The box of claim 7, wherein said bottom panel contains a plurality of openings therein.

12. The box of claim 7, wherein said first edge contains a latch and said second edge contains a receptacle for said latch.

13. The box of claim 7, wherein said bottom panel forms an air pruning gap.

14. The box of claim 7, wherein said stabilizer is a pipe or board.

* * * * *